(12) United States Patent
Yamauchi et al.

(10) Patent No.: US 10,840,684 B2
(45) Date of Patent: Nov. 17, 2020

(54) LINK AND WIRE HARNESS

(71) Applicant: Yazaki Corporation, Tokyo (JP)

(72) Inventors: Akinori Yamauchi, Toyota (JP); Toru Kato, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/578,585

(22) Filed: Sep. 23, 2019

(65) Prior Publication Data

US 2020/0136359 A1    Apr. 30, 2020

(30) Foreign Application Priority Data

Oct. 31, 2018  (JP) .................................. 2018-206077

(51) Int. Cl.
*H02G 3/06* (2006.01)
*H02G 3/04* (2006.01)
*B60R 16/02* (2006.01)

(52) U.S. Cl.
CPC ........... *H02G 3/06* (2013.01); *B60R 16/0207* (2013.01); *H02G 3/0468* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,396,725 A | * | 3/1946 | Thomas, Jr. | ........... H01R 31/00 439/590 |
| 2,706,742 A | * | 4/1955 | Ehlers | ...................... H01G 2/12 174/564 |
| 3,597,594 A | * | 8/1971 | Evans | ..................... G06M 9/02 235/62 R |
| 3,934,902 A | * | 1/1976 | McNamee | .......... F16L 25/0036 285/133.21 |
| 4,815,984 A | * | 3/1989 | Sugiyama | ........... B60R 16/0239 174/72 A |
| 5,500,179 A | * | 3/1996 | Onishi | .................... B29C 49/20 264/152 |
| 6,376,777 B1 | * | 4/2002 | Ito | ........................ H02G 3/0468 16/2.1 |
| 2006/0027391 A1 | * | 2/2006 | Tsubaki | ............... H02G 11/006 174/72 A |

FOREIGN PATENT DOCUMENTS

| | | |
|---|---|---|
| JP | 2600985 Y2 | 11/1999 |
| JP | 2004-6210 A | 1/2004 |
| JP | 2011244650 A * | 12/2011 |

* cited by examiner

*Primary Examiner* — Binh B Tran
*Assistant Examiner* — Krystal Robinson
(74) *Attorney, Agent, or Firm* — Sughrue Mion, PLLC (57) ABSTRACT

A link connects a corrugated tube to a box-shaped protector. The link includes an engagement portion capable of engaging with the corrugated tube, an attachment portion capable of attaching to the protector, and a projection piece projecting alongside the corrugated tube.

5 Claims, 7 Drawing Sheets

LINK AND WIRE HARNESS

CROSS-REFERENCES TO RELATED APPLICATION(S)

This application is based on and claims priority from Japanese Patent Application No. 2018-206077 filed on Oct. 31, 2018, and the entire contents of which are incorporated herein by reference.

BACKGROUND

Field of the Invention

The present invention relates to a link for linking a corrugated tube and a box-shaped protector to each other and to a wire harness.

Description of Related Art

Conventionally, among methods for routing an electric wire bundle in, for example, an automobile body is a method in which the electric wire bundle is housed in a corrugated tube and the corrugated tube is fixed to a box-shaped protector. In general, corrugated tubes have large-diameter portions and small-diameter portions that are arranged alternately along the axial line. In fixing such a corrugated tube to a protector, a link for linking the corrugated tube to the protector may be used.

For example, one conventional link has a tubular shape so that it can be attached to a corrugated tube so as to surround outer surfaces of the corrugated tube. The inner circumferential surface of this link is formed with ribs to engage with projections and recesses that are formed by large-diameter portions and small-diameter portions of the corrugated tube. This link is attached to a protector in a state that the link is engaged with the corrugated tube by these ribs. As a result, the corrugated tube is fixed to the protector via the link.

As for details of the above terminal-attached electric wire, refer to JP 2004-006210 A and Japanese Utility Model Registration No. 2,600,985.

SUMMARY

A corrugated tube and a protector that are fixed to each other via a link in the above-described manner are designed so as not to suffer an unintentional separation, positional deviation, etc. However, when, for example, the corrugated tube receives too strong an external force, there may occur an event that the engagement between the link and the corrugated tube cannot be maintained properly due to, for example, reduction of the diameter of the corrugated tube. It is desirable that the probability of occurrence of such trouble relating to the engagement be minimized because it may cause a positional deviation or separation between the corrugated tube and the protector.

An object of the invention is to provide a link capable of linking a corrugated tube and a protector properly as well as a wire harness that is equipped with a corrugated tube and a protector that are linked to each other by such a link.

Embodiments of the present invention provide the following items [1] to [5]:

[1] A link for linking a corrugated tube to a box-shaped protector, the link comprising:
   an engagement portion capable of engaging with the corrugated tube;
   an attachment portion capable of attaching to the protector; and
   a projection piece projecting alongside the corrugated tube.

[2] The link according to the item [1], wherein the link has an annular shape allowing the corrugated tube to be inserted to the link;
   the engagement portion is provided on an inner surface of the link;
   the attachment portion is provided on an outer surface of the link to be attached to the protector to establish a state that an opening portion of the link and an internal space of the protector are connected to each other; and
   the projection piece projects alongside outer surfaces of the corrugated tube from a circumferential periphery of the opening portion of the link.

[3] The link according to the item [1] or the item [2], wherein
   the projection piece has a projection projecting to a direction to separate from the corrugated tube.

[4] A wire harness comprising:
   an electric wire bundle;
   a corrugated tube housing the electric wire bundle;
   a box-shaped protector to fix the corrugated tube; and
   a link linking the corrugated tube and the protector to each other,
   the link comprising an engagement portion capable of engaging with the corrugated tube, an attachment portion capable of attaching to the protector, and a projection piece projecting alongside the corrugated tube.

[5] The wire harness according to the item [4], wherein
   the corrugated tube and the projection piece are wound with a fixing tape together.

According to first aspect of the invention, relating to the item [1], the link is engaged with the corrugated tube by the engagement portion. If, for example, the corrugated tube and the projection piece which projects alongside the corrugated tube are wound with a fixing tape together, the link and corrugated tube can be connected to each other more strongly than in a case the link and the corrugated tube are engaged with each other by only the engagement portion. As a result, even where too strong an external force acts on the corrugated tube, a state that the link and the corrugated tube are engaged with each other can be maintained more properly. The projection piece and the corrugated tube may be fixed to each other by a mechanical method using a clip or the like or with an adhesive or the like. The method for fixing the projection piece and the corrugated tube is not limited to winding a fixing tape on them together. The projection piece and the corrugated tube may be fixed to each other by a mechanical method using a clip or the like or with an adhesive or the like.

As such, the link having this configuration can link the corrugated tube and the protector more properly than conventional links.

Incidentally, it is possible to use the link in such a manner as to prepare, in advance, plural kinds of links that are different from each other in dimensions or shape of the internal space and selects a proper link according to the shapes etc. of the corrugated tube and the protector. Using the link in this manner makes it possible to absorb thickness differences between the corrugated tubes in fixing various corrugated tubes that are different from each other in thickness. Thus, the use of the link having this configuration makes it unnecessary to prepare protectors for corrugated tubes that are different from each other in thickness and to thereby lower the manufacturing cost of the protector (and hence the manufacturing cost of a wire harness).

According to second aspect of the invention, relating to the item [2], an inner surface of the link is provided with the engagement portion, the attachment portion is provided on an outer surface of the link, and the projection piece projects from a circumferential periphery of the opening portion of the link. With these measures, the link that can be used in the manners described in the above statements relating to the link having the configuration of item [1].

According to third aspect of the invention, relating to the item [3], the projection piece and the corrugated tube can be fixed to each other more strongly by using the projection that is formed on the projection piece in fixing the projection piece and the corrugated tube to each other. Where a fixing tape is wound on the projection piece and the corrugated tube together, strong fixing is enabled by hooking the fixing tape on the projection.

According to fourth aspect of the invention, relating to the item [4], the link is engaged with the corrugated tube by the engagement portion. If, for example, the corrugated tube and the projection piece which projects alongside the corrugated tube are wound with a fixing tape together, the link and corrugated tube can be connected to each other more strongly than in a case the link and the corrugated tube are engaged with each other by only the engagement portion. As a result, even where too strong an external force acts on the corrugated tube, a state that the link and the corrugated tube are engaged with each other can be maintained more properly. Thus, the wire harness having this configuration can maintain a state that the corrugated tube and the protector are connected to each other properly.

According to fifth aspect of the invention, relating to the item [5], the corrugated tube and the projection piece of the link are wound with a fixing tape together. As a result, the link and corrugated tube can be connected to each other more strongly than in a case the link and the corrugated tube are engaged with each other by only the engagement portion. As a result, even where too strong an external force acts on the corrugated tube during use of the wire harness, a state that the link and the corrugated tube are engaged with each other can be maintained more properly.

The invention can provide a link capable of linking a corrugated tube and a protector properly as well as a wire harness that is equipped with a corrugated tube and a protector that are linked to each other by such a link.

The invention has been described above concisely. The details of the invention will become more apparent when the description of the embodiments described below are read through with reference to the accompanying drawings.

DETAILED DESCRIPTION

Embodiment

A link 20 and a wire harness 1 according to an embodiment of the present invention will be hereinafter described with reference to the drawings.

Figure 1:
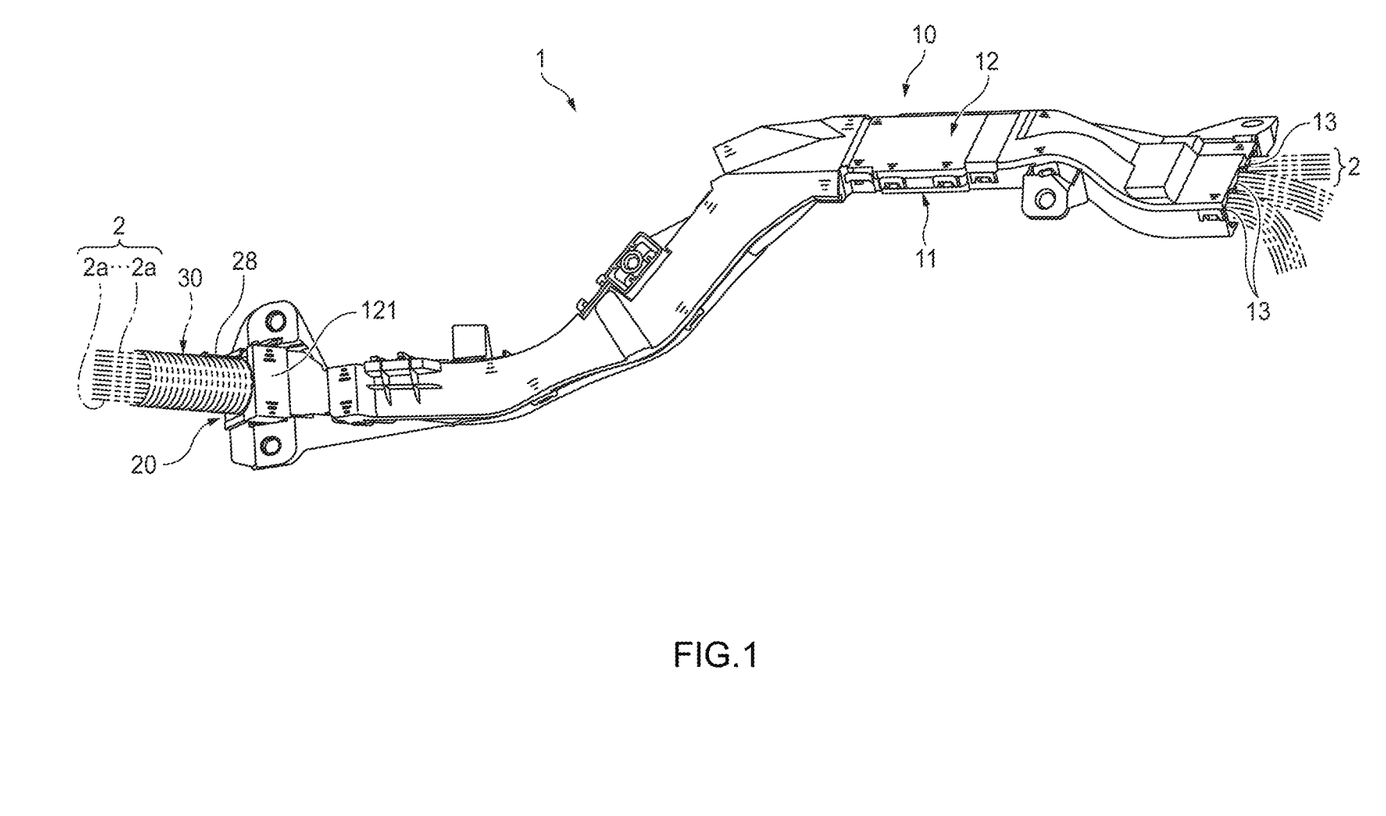
FIG. 1 is a perspective view of a wire harness according to an embodiment of the present invention.

As shown in FIG. 1, the wire harness 1 according to the embodiment is equipped with a protector 10 which houses an electric wire bundle 2 consisting of plural electric wires 2a and a link 20 which is provided at an end portion of the protector 10. The link 20 is also called a protector stopper. The protector 10 is a member for routing the electric wire bundle 2 along a prescribed route in its internal space and fixing the electric wire bundle 2 to an attachment target body such as a vehicle body. The link 20 is a member for fixing, to the end portion of the protector 10, a corrugated tube 30 which houses the electric wire bundle 2 and can be bent into an arbitrary shape.

Figure 2:
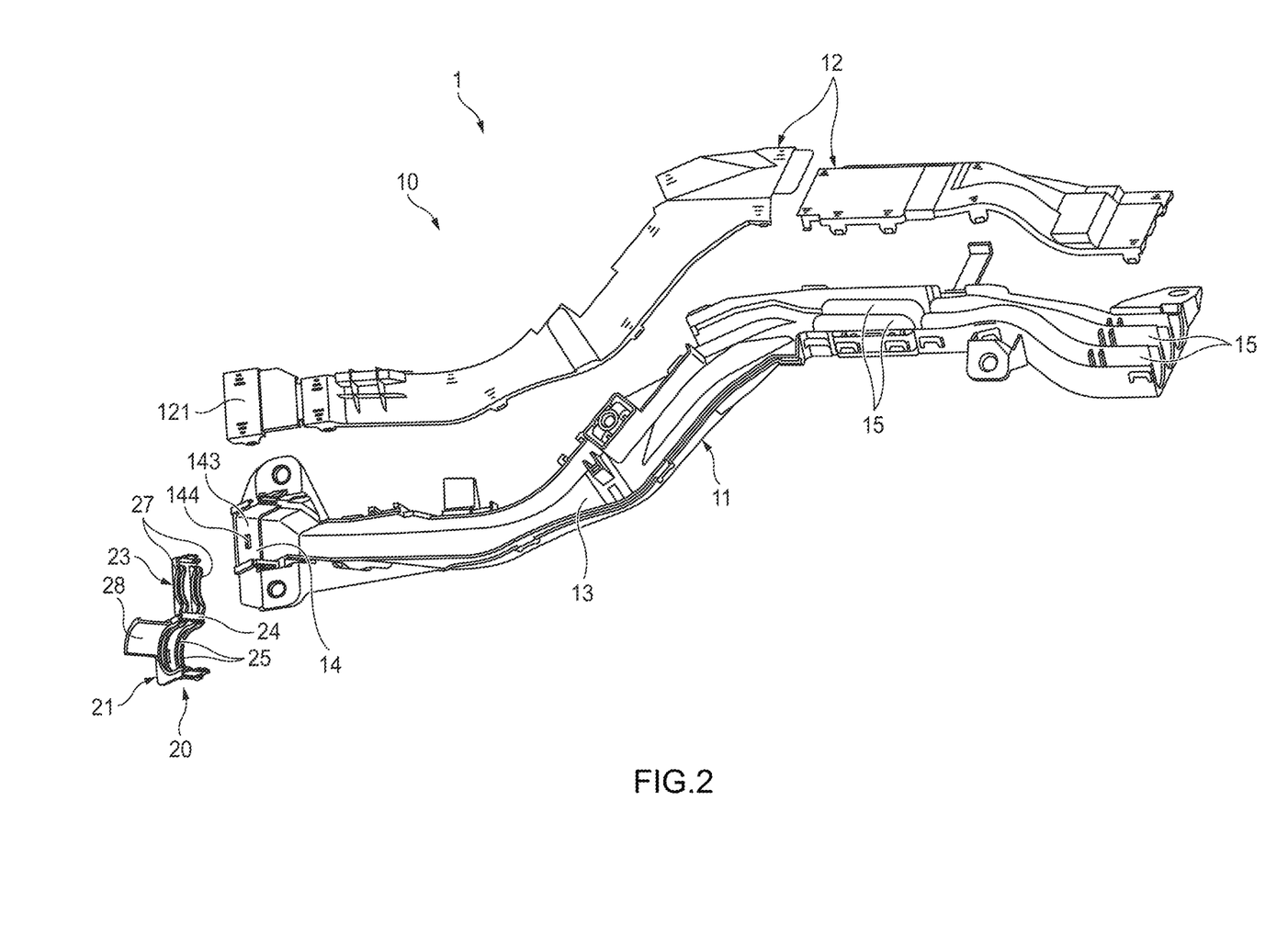
FIG. 2 is an exploded perspective view of a link and a protector according to the embodiment and a protector to which the link is attached.

As shown in FIGS. 1 and 2, the protector 10 is equipped with a protector main body 11 in which an approximately C-shaped sectional shape continues in its longitudinal direction and protector lid portions 12 which close an opening that is formed at an end of the protector main body 11 in a direction perpendicular to its longitudinal direction. The protector main body 11 and the protector lid portions 12 are molds of a synthetic resin, for example. The protector lid portions 12 can be detached from the protector main body 11. A communication hole 13 which is rectangular in cross section and through which the electric wire bundle 2 is to be routed is formed inside the protector 10 by the protector main body 11 and the protector lid portions 12. The protector 10 has a prescribed three-dimensional shape that is suitable for a location where the electric wire bundle 2 is to be routed.

The communication hole 13 formed inside the protector 10 are separated as necessary by partitions 15 which are continuous in a routing direction. In this example, the communication hole 13 is divided into three portions at one end (right end in FIGS. 1 and 2) of the protector 10. The protector main body 11 is a unitized body having a prescribed shape. Plural protector lid portions 12 are attached to the protector main body 11. The protector 10 is provided with, at the other end (left end in FIG. 2), a link attachment portion 14 for attachment of the link 20.

Figure 3:
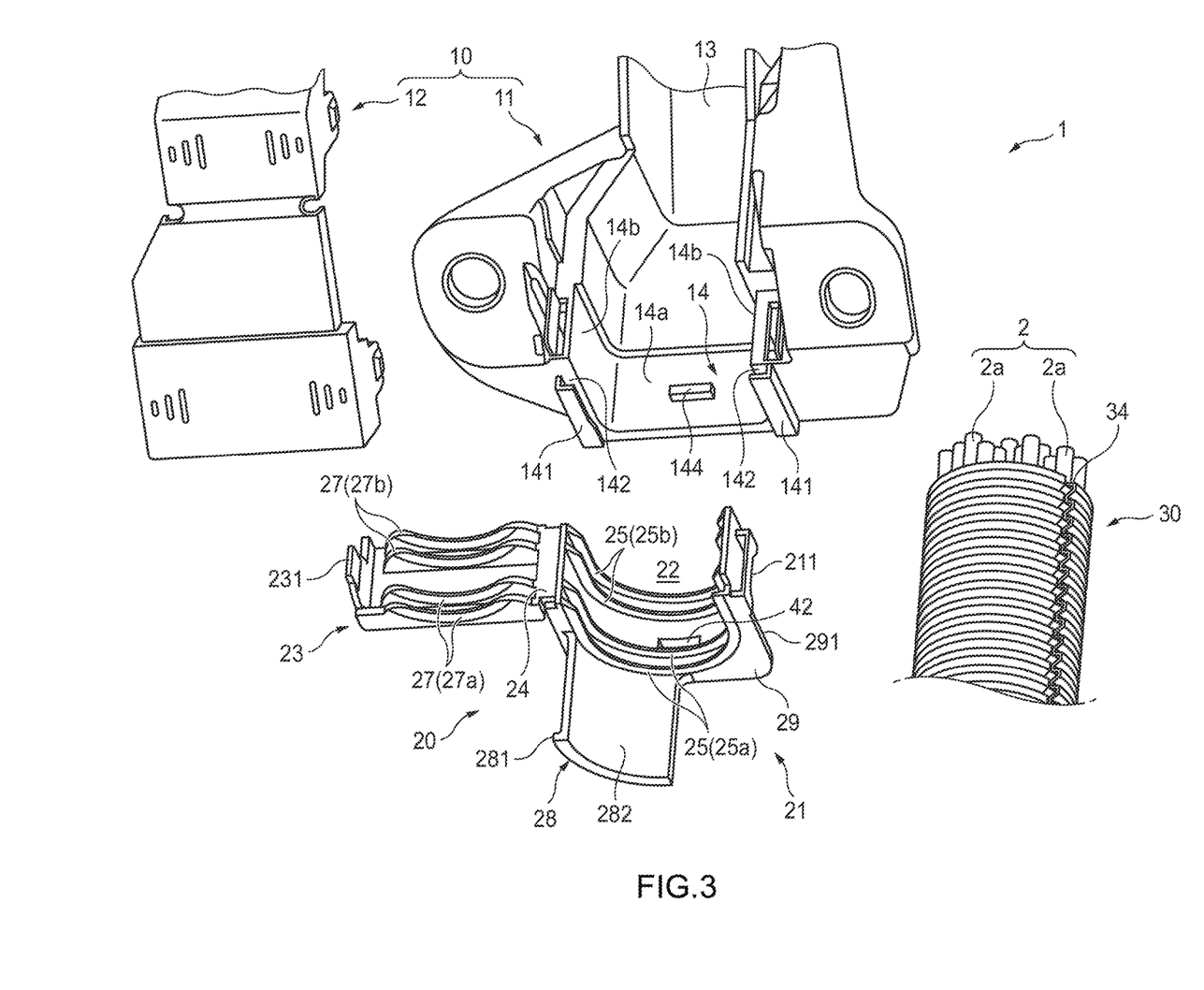
FIG. 3 is an exploded perspective view showing and end portion of the protector, the link, and an end portion of a corrugated tube.

As shown in FIG. 3, the link attachment portion 14 has a bottom surface 14a and a pair of side surfaces 14b which are opposed to each other and connected to each other by the bottom surface 14a. The bottom surface 14a is formed with a projection 144. An outer side surface of the link attachment portion 14 is formed with a pair of guides 141 which are L-shaped in cross section. Slide spaces 142 are formed inside the respective guides 141, that is, on such sides as to be opposed to each other. The link 20 is attached to the thus-configured link attachment portion 14.

The link 20 is equipped with a link main body 21 and a link lid portion 23. The link main body 21 holds the corrugated tube 30, and the link lid portion 23 prevents coming-off of the corrugated tube 30 held by the link main body 21. The link main body 21 and the link lid portion 23 which are connected to each other by a thin portion 24 which functions as a hinge are a unified mold made of a synthetic resin, for example.

The link main body 21 has an approximately rectangular external shape and defines an internal space 22 which is open at one end (at the top in FIG. 3). Alternatively, the link 20 may be formed by molding the link main body 21 and the link lid portion 23 as separate bodies so that they can be attached to and detached from each other.

Figure 4A:
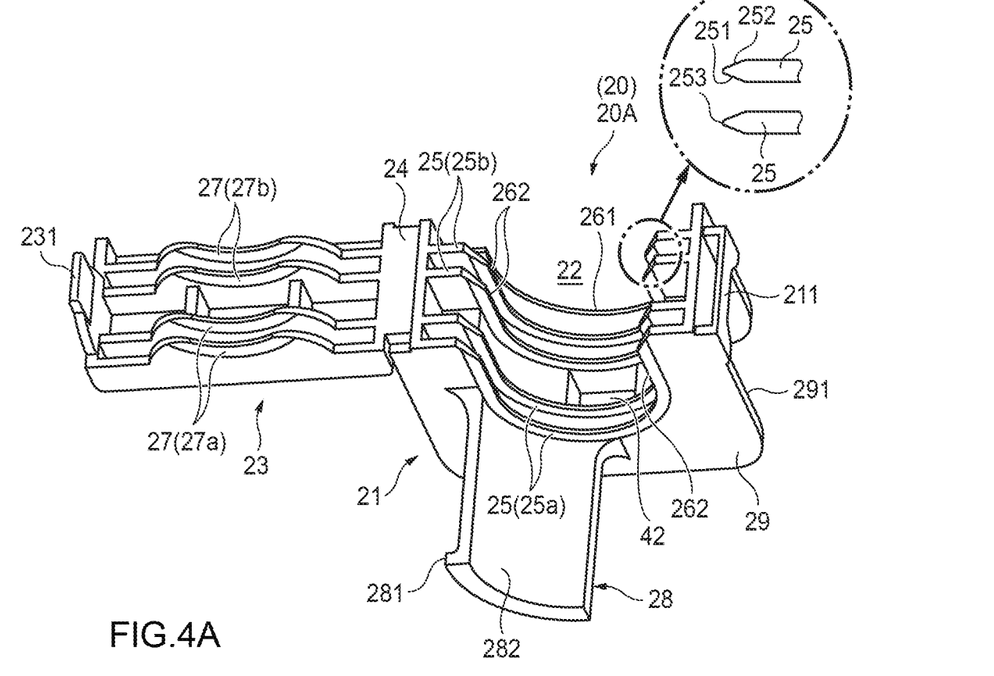
FIG. 4A is a perspective view showing a link in an open state for a corrugated tube having a small diameter.
Figure 4B:
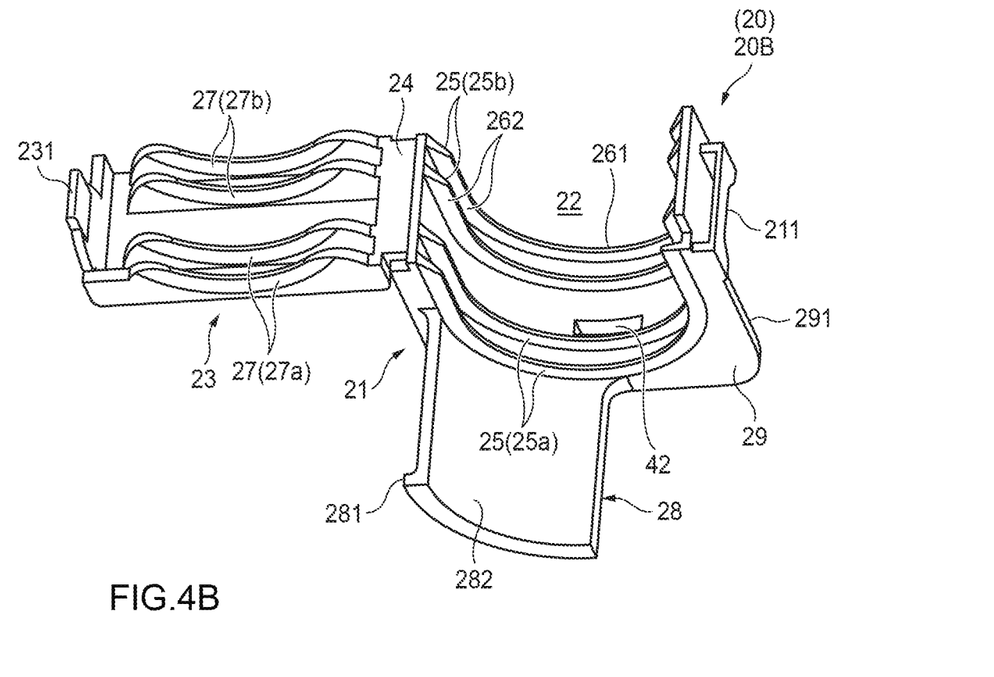
FIG. 4B is a perspective view showing a link in an open state for a corrugated tube having a large diameter.

FIG. 4A is a perspective view showing a link 20A in an open state for a corrugated tube having a small diameter, and FIG. 4B is a perspective view showing a link 20B in an open state for a corrugated tube having a large diameter. Since the links 20A and 20B shown in FIGS. 4A and 4B, respectively, are the same except that corrugated tubes 30 to be held by them are different from each other in the outer diameters of large-diameter portions and small-diameter portions, their same or corresponding portions are given the same reference symbols and redundant descriptions will be avoided. The links 20A and 20B will be referred to generically as "link 20" except in particular cases that they should be discriminated from each other.

As shown in FIGS. 3, 4A, and 4B, the above-mentioned thin portion 24 is provided on one side of the open end of the link main body 21 and a lock portion 211 for locking the link lid portion 23 closed is provided on the other side of the open end of the link main body 21. Plural groups of main body ribs 25a and 25b are formed in the internal space 22 of the link main body 21 so as to be arranged in the routing direction of the corrugated tube 30. Each of the groups of main body ribs 25a and 25b consists of two main body ribs 25.

Each main body rib 25 has a semicircular curved portion 261 and a pair of straight portions 262 which are continuous with the curved portion 261 and are opposed to each other. The inner diameter of the curved portion 261 and the distance between the pair of straight portions 262 are larger than the outer diameter of small-diameter portions 33 of the corrugated tube 30 to be held and smaller than the outer diameter of large-diameter portions 32 of the corrugated tube 30.

Figure 5:
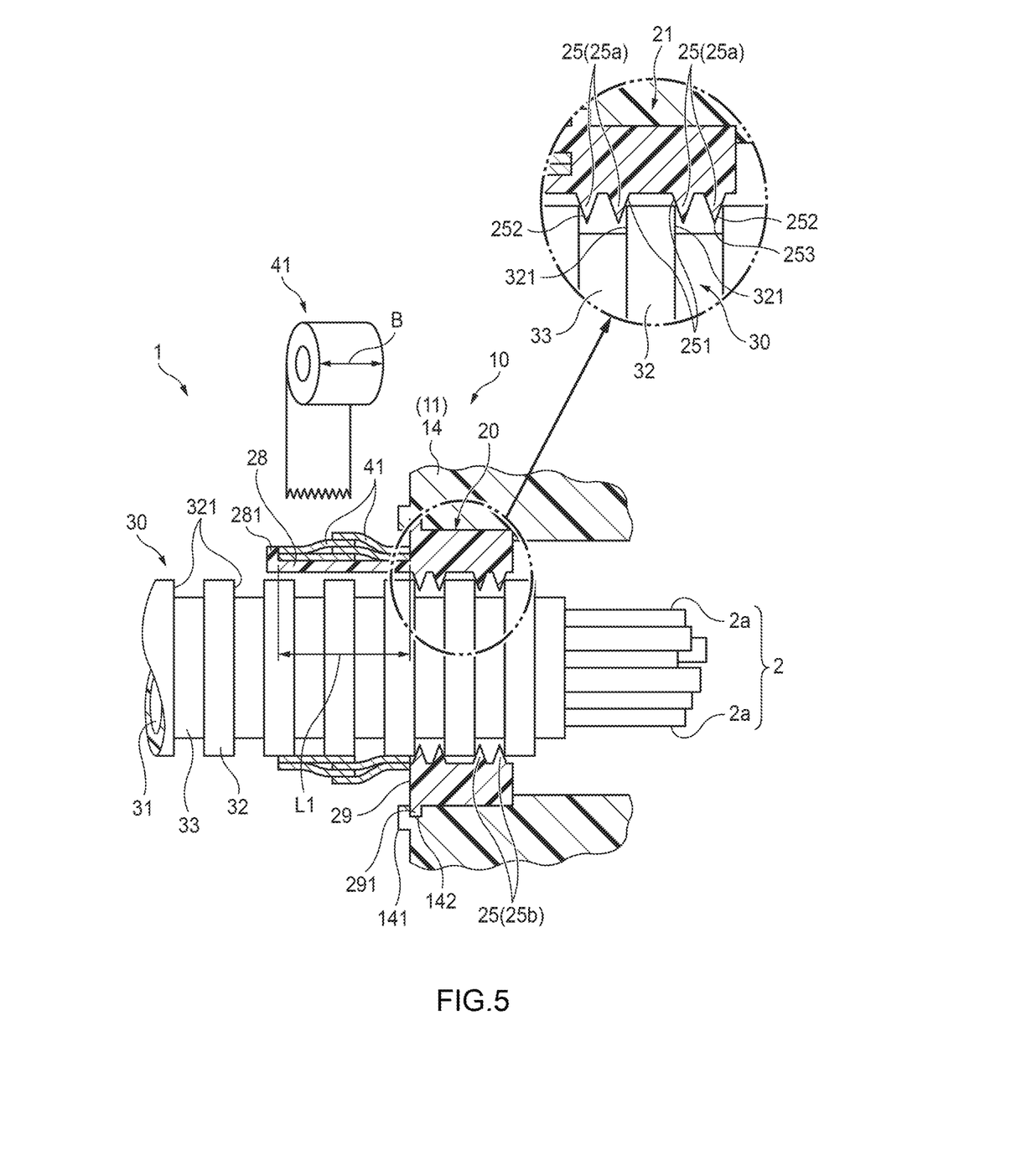
FIG. 5 is a sectional view showing how the corrugated tube is connected to the link.

As shown in FIG. 5, each main body rib 25 is approximately V-shaped in cross section so as to become narrower toward the center of the internal space 22 and has a pair of slant surfaces 251 and 252. The groups of main body ribs 25a and 25b are arranged at such an interval that a large-diameter portion 32 of the corrugated tube 30 is sandwiched between (i.e., two erected surfaces 321 of the large-diameter portion 32 are in contact with) the inside slant surfaces 251 of the inside main body ribs 25

The slant surface 251 or 252 of each main body rib 25 of the groups of main body ribs 25a and 25b is in elastic line contact with the corresponding edge between an outer circumferential surface 322 and an erected surface 321 of a large-diameter portion 32. This structure suppresses movement of the corrugated tube 30 with respect to the link 20 in the longitudinal direction of the corrugated tube 30.

Returning to FIG. 3, the link lid portion 23 is a member for covering the open end of the link main body 21 and is supported rotatably by the thin portion 24 provided between the link main body 21 and the link lid portion 23. The tip, opposite to the thin portion 24, of the link lid portion 23 is formed with a nail 231 to be locked on the lock portion 211 of the link main body 21 when the link lid portion 23 is closed.

The surface, to be opposed to the link main body 21, of the link lid portion 23 is formed with groups of lid ribs 27a and 27b so that they face the respective groups of main body ribs 25a and 25b of the link main body 21. Each of the groups of lid ribs 27a and 27b has two lid ribs 27 and serves to hold the corrugated tube 30 put in the link main body 21 so that the corrugated tube 30 does not come off the internal space 22.

Each lid rib 27 of the groups of lid ribs 27a and 27b is cut into an arc shape that is suitable for the outer diameters of the large-diameter portions 32 and the small-diameter portions 33 of the corrugated tube 30 to be held by the link 20. The sectional shape of each lid rib 27 is shaped in the same manner as that of each main body rib 25.

When the link 20 is closed by putting the link lid portion 23 on the link main body 21, the groups of lid ribs 27a and 27b come approximately continuous with the groups of main body ribs 25a and 25b and they come to hold the corrugated tube 30 cooperatively.

The link main body 21 is provided with an end plate 29 which has an end surface that is a surface, opposite to the protector 10, of the link main body 21. The end plate 29 is a plate member, and its outer circumferential portion 291 projects outward. A cut 42 is formed in the link main body 21 between the groups of main body ribs 25a and 25b. The cut 42 is fitted with the projection 144 of the link attachment portion 14 of the protector 10. The link 20 is positioned in such a manner that the outer circumferential portion 291 of the end plate 29 goes through the slide spaces 142 of the link attachment portion 14 which is guided by its guides 141 (also see FIG. 5) and the projection 144 of the link attachment portion 14 is fitted into the cut 42. As a result, the link 20 is held by the link attachment portion 14 stably.

A projection piece 28 projects from the end plate 29 of the link main body 21 to the side opposite to the protector 10. The projection piece 28 is provided so as to correspond to part of the U-shaped curved portion 261 of each main body rib 25 (in this example, half of the U-shaped curved portion 261, that is, a quarter circumference). The projection piece 28 has an inner circumferential surface 282 that shares the axial line with the corrugated tube 30 held by itself and has the same diameter as the large-diameter portions 32 of the corrugated tube 30.

Thus, the inner circumferential surface 282 of the projection piece 28 is in contact with the outer surfaces 322 of large-diameter portions 32 of the corrugated tube 30. There are no particular limitations on the size of the projection piece 28; for example, the projection piece 28 may correspond to the whole of the U-shaped curved portion 261 of each main body rib 25 (i.e., half circumference).

FIG. 5 is a sectional view showing how the corrugated tube 30 is held by the link 20. As shown in FIG. 5, an adhesive tape 41 is wound on the projection piece 28 and the corrugated tube 30 together after the corrugated tube 30 is held by the link 20. The projection length L1 of the projection piece 28 is set longer than the width B of the adhesive tape 41. The tip of the outer circumferential surface of the projection piece 28 is formed with a projection 281 which projects outward. As a result, when wound on the projection piece 28 and the corrugated tube 30 together, the adhesive tape 41 is less prone to stick out of the projection piece 28. Furthermore, the projection 281 suppresses occurrence of an event that the adhesive tape 41 goes out of the projection piece 28 after being wound.

The electric wire bundle 2 guided by the protector 10 is housed in the internal space 31 of the corrugated tube 30. The corrugated tube 30 is made of a resin and is configured in such a manner that the large-diameter portions 32 having a large outer diameter and the small-diameter portions 33 having a small outer diameter are arranged continuously and alternately in the longitudinal direction. Thus, each small-diameter portion 33 is interposed between erected surfaces 321 of the adjacent large-diameter portions 32.

A slit 34 is formed in the corrugated tube 30 along a generatrix (see FIG. 3). Whereas the slit 34 of the corrugated tube 30 is closed ordinarily, when the corrugated tube 30 is deformed so that large-diameter portions 32 and small-diameter portions 33 are increased in diameter in a portion including the slit 34, the slit 34 is opened and the electric wire bundle 2 consisting of the plural electric wires 2a can be inserted into the internal space 31 easily through the slit 34. The corrugated tube 30 is set in the link 20 so that small-diameter portions 33 correspond to the respective groups of main body ribs 25a and 25b.

Next, a manufacturing process of the wire harness 1 will be described.

First, an electric wire bundle 2 which is a bundle of plural electric wires 2a is housed in the corrugated tube 30. At this time, the electric wire bundle 2 is housed in the corrugated tube 30 so that a portion, longer than or equal to a portion to be housed in the protector 10 plus a portion to stick out of the other end of the protector 10, of the electric wire bundle 2 is located outside the corrugated tube 30. Where a portion, to be housed in the corrugated tube 30, is long or a component such as a connector including terminals etc. is attached to the tip of the electric wire bundle 2, that portion of the electric wire bundle 2 may be inserted into the corrugated tube 30 through its slit 34 (see FIG. 3).

Then the link 20 is attached to the end portion of the corrugated tube 30. The large-diameter portion 32 of the end portion of the corrugated tube 30 is pushed into between the two groups of main body ribs 25a and 25b of the link main body 21 so that the small-diameter portions 33 of the end portion are opposed to the two respective groups of main body ribs 25a and 25b. At this time, the corrugated tube 30 is pushed in to the curved portions 261 of the groups of main body ribs 25a and 25b.

The link lid portion 23 is thereafter put on the link main body 21 and the nail 231 is hooked on and thereby fixed to the lock portion 211 of the link main body 21. Then an adhesive tape 41 is wound on both of the projection piece 28 of the link 20 and the outer surfaces 322, in contact with the projection piece 28, of the corrugated tube 30, whereby the link 20 and the corrugated tube 30 are fixed to each other. The step of winding an adhesive tape 41 on the projection piece 28 and the corrugated tube 30 together may be executed after the link 20 is attached to the protector 10.

Subsequently, the protector lid portions 12 of the protector 10 are opened and the portion, projecting from the corrugated tube 30, of the electric wire bundle 2 is routed along a prescribed route and an end portion of the electric wire bundle 2 is put out of the other end of the protector 10. Then the link 20 to which the corrugated tube 30 is attached is attached to the link attachment portion 14 of the protector 10. At this time, the outer circumferential portion 291 of the end plate 29 of the link 20 is inserted into the slide spaces 142 of the link attachment portion 14 of the protector 10 from above until the projection 144 of the link attachment portion 14 is fitted into the cut 42 of the link 20. The link 20 is thus attached to the protector 10.

Figure 6:
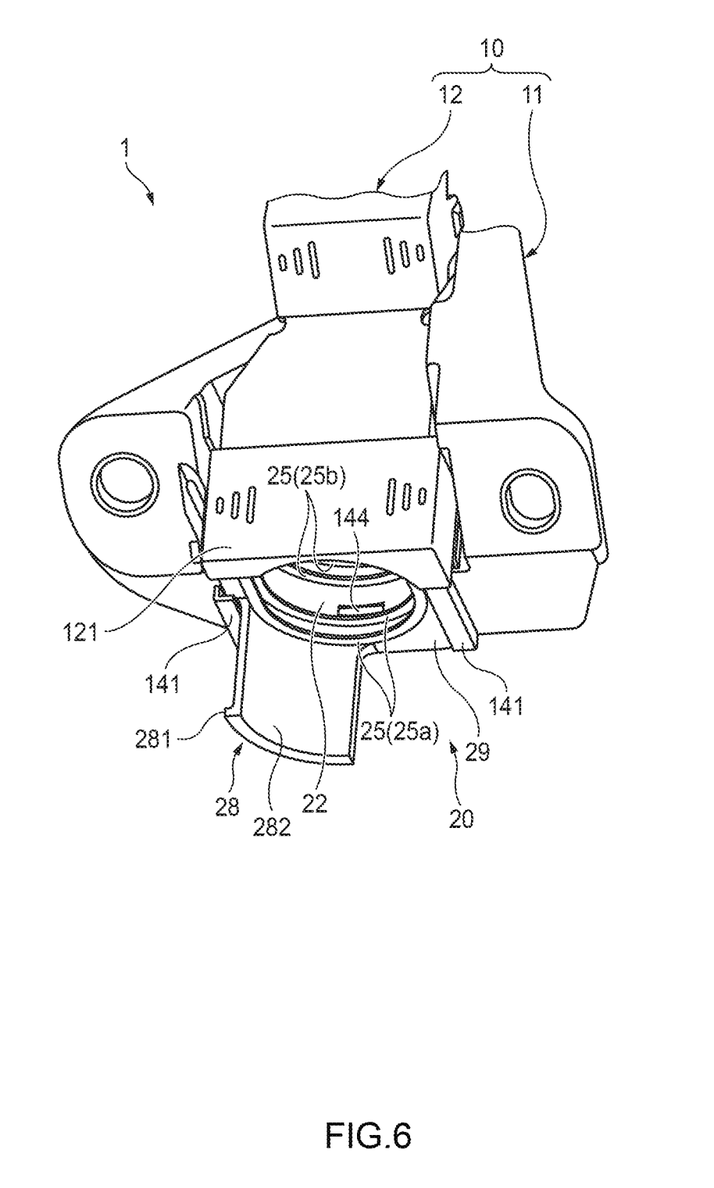
FIG. 6 is a perspective view showing a state that the link is attached to an end portion of a protector.

Finally, the protector lid portions 12 are put on the protector main body 11 and fixed to the latter by fastening means such as screws. At this time, the link 20 can be prevented from coming off because a link pressing portion 121, opposed to the link attachment portion 14 of the protector main body 11, of the protector lid portion 12 presses the link 20 that is attached to the link attachment portion 14 (see FIG. 6). Instead of screws, a lock portion(s) for locking the protector lid portions 12 on the protector main body 11 may be used as the fastening means. As a further alternative, such a member(s) as a belt(s) for fixing the protector lid portions 12 to the protector main body 11 may be used.

As described above, since the link 20 according to the embodiment can engage with outer surfaces 322 of the corrugated tube 30 and the internal space 31 of the corrugated tube 30 can communicate with the communication hole 13 of the protector 10, the electric wire bundle 2 that is partially housed in the internal space 31 of the corrugated tube 30 and thereby protected can be guided into the protector 10. Since an adhesive tape 41 is wound on both of the corrugated tube 30 and the projection piece 28 which projects parallel with the corrugated tube 30, the link 20 and the corrugated tube 30 can be connected to each other more strongly than in a case the link 20 and the corrugated tube 30 are engaged with each other only by the main body ribs 25. As a result, even where too strong an external force acts on the corrugated tube 30, a state that the link 20 and the corrugated tube 30 are engaged with each other can be maintained properly.

The link 20 according to the embodiment can accommodate plural kinds of corrugated tube 30 that are different from each other in external dimensions or sectional shape by preparing, in advance, plural kinds of links 20 that are different from each other in the opening dimensions or opening shape of the internal space 22 and using one of them selectively, that is, attaching it to the protector 10. As such, the link 20 according to the embodiment can accommodate various kinds of electric wires 2a, different from each other in number or thickness, constituting the electric wire bundle 2 and various kinds of electric wire bundles 2 that are different from each other in sectional shape etc.

Having the projection piece 28 which projects parallel with the outer surfaces 322 of the corrugated tube 30, the link 20 according to the embodiment can fix the corrugated tube 30 to the protector 10 easily and reliably by winding an adhesive tape 41 on the corrugated tube 30 and the projection piece 28 together.

In the link 20 according to the embodiment, since each of the groups of main body ribs 25a and 25b for holding the corrugated tube 30 consists of two main body ribs 25, each main body rib 25 can be brought into elastic line contact with the corresponding edge between an outer circumferential surface 322 and an erected surfaces 321 of a large-diameter portion 32 by selecting a sectional shape, sectional dimensions, a location, etc. of the main body rib 25 as appropriate. As such, the link 20 according to the embodiment can hold the corrugated tube 30 elastically and provide an effect of buffering vibration etc.

In the wire harness 1 according to the embodiment, the projection piece 28 of the link 20 can engage with outer surfaces 322 of the corrugated tube 30 and the internal space 31 of the corrugated tube 30 can communicate with the communication space 13 of the protector 10. Thus, the electric wire bundle 2 that is protected by being housed in the internal space 31 of the corrugated tube 30 partially can be guided to the inside of the protector 10.

The wire harness 1 according to the embodiment can accommodate plural kinds of corrugated tube 30 that are different from each other in external dimensions or sectional shape by preparing, in advance, plural kinds of links 20 that are different from each other in the opening dimensions or opening shape of the internal space 22 and using one of them selectively, that is, attaching it to the protector 10. As such, the wire harness 1 according to the embodiment can accommodate various kinds of electric wires 2a, different from each other in number or thickness, constituting the electric wire bundle 2 and electric wire bundles 2 having various sectional shapes etc.

Furthermore, in the wire harness 1 according to the embodiment, since the link 20 has the projection piece 28 which projects parallel with the outer surfaces 322 of the corrugated tube 30, the corrugated tube 30 can be fixed to the protector 10 easily and reliably by winding an adhesive tape 41 on the corrugated tube 30 and the projection piece 28 together. With this measure, in the wire harness 1 according to the embodiment, positional deviation of the corrugated tube 30 in the radial direction in the internal space 22 of the link 20 can be suppressed.

Other Embodiments

The invention is not limited to the above embodiment and various modifications, improvements, etc. can be made as appropriate within the scope of the invention. The materials, shapes, sets of dimensions, numbers, locations, etc. of the respective constituent elements of the above embodiment are not limited to those disclosed but can be determined in desired manners as long as the invention can be implemented.

Figure 7:
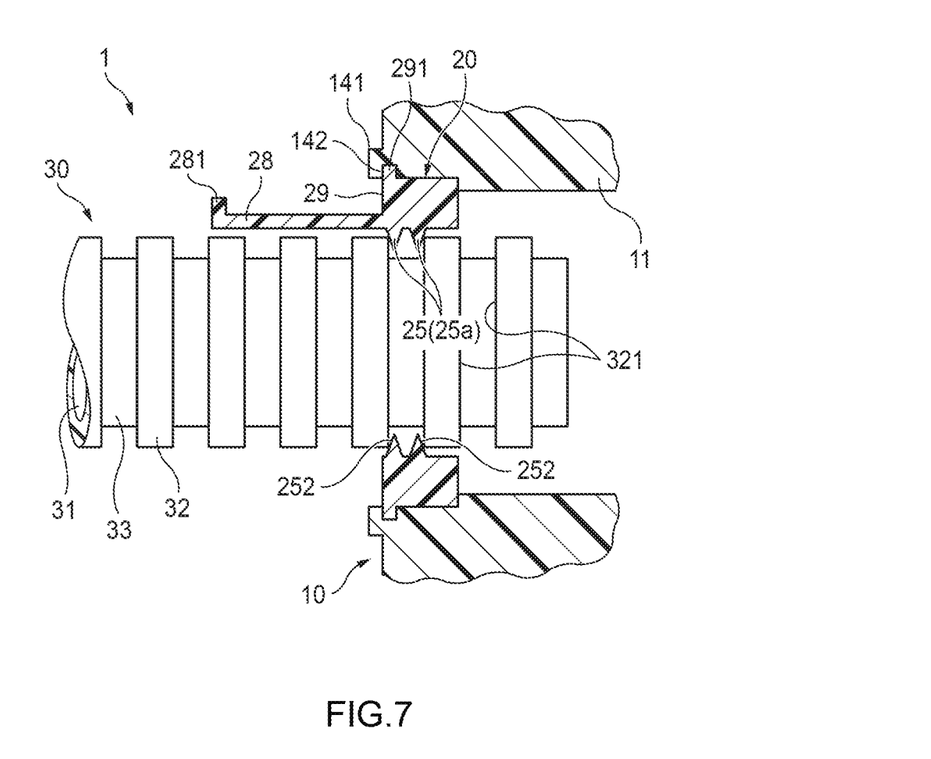
FIG. 7 is a sectional view showing a link according to a modification.

For example, in the embodiment, in the link 20, the two groups of main body ribs 25a and 25b for pressing the corrugated tube 30 are arranged at the prescribed interval in such a manner that each group consists of two main body ribs 25. Alternatively, as shown in FIG. 7, only one group of main body ribs 25 may be provided. In this case, since outside slant surfaces 252 of the two main body ribs 25 are sandwiched between erected surfaces 321 of large-diameter portions 32 of the corrugated tube 30, movement of the corrugated tube 30 in the wiring direction can be prevented.

In the embodiment, each main body rib 25 is shaped like a triangle having a sharp tip portion. Alternatively, a rectangular rib having no sharp tip portion may be used. In this case, it is desirable that the width of the rib be set equal to the interval between erected surfaces 321 of adjacent large-diameter portions 32 of the corrugated tube 30.

In the embodiment, the link 20 has the link main body 21 and the link lid portion 23 for covering the open end of the link main body 21. Alternatively, the link 20 may be formed by two same divisional members each having a half-circle-shaped opening.

In the embodiment, the end plate 29 of the link main body 21 has the projection piece 28 which projects to the side opposite to the protector 10. Alternatively, a projection piece may be provided that projects to the side corresponding to the inside of the protector 10 in the link main body 21. In this case, it is an appropriate procedure to fix the corrugated tube 30 to the projection piece with an adhesive 41 before attaching the link 20 to the protector 10.

Furthermore, in the embodiment, the projection piece 28 and the corrugated tube 30 are fixed to each other with an adhesive tape 41. Alternatively, the projection piece 28 and the corrugated tube 30 may be fixed to each other by a mechanical method using a clip or the like or with an adhesive or the like.

Features of the above-described link and wire harness according to the embodiment of the invention will be summarized below concisely in the forms of items [1] to [5]:

[1] A link (20) for linking a corrugated tube (30) to a box-shaped protector (10), the link (20) comprising:

an engagement portion (25, 27) capable of engaging with the corrugated tube (30);

an attachment portion (29) capable of attaching to the protector (10); and a projection piece (28) projecting alongside the corrugated tube (30).

[2] The link (20) according to the item [1], wherein the link (20) has an annular shape allowing the corrugated tube (30) to be inserted to the link (20);

the engagement portion (25, 27) is provided on an inner surface of the link (20);

the attachment portion (29) is provided on an outer surface of the link (20) to be attached to the protector (10) to establish a state that an opening portion (261) of the link (20) and an internal space of the protector (10) are connected to each other; and the projection piece (28) projects alongside outer surfaces of the corrugated tube (30) from a circumferential periphery of the opening portion (261) of the link (20).

[3] The link (20) according to the item [1] or the item [2], wherein the projection piece (28) has a projection projecting to a direction to separate from the corrugated tube (30).

[4] A wire harness comprising:

an electric wire bundle;

a corrugated tube (30) housing the electric wire bundle;

a box-shaped protector (10) to fix the corrugated tube (30); and a link (20) linking the corrugated tube (30) and the protector (10) to each other, the link (20) comprising an engagement portion (25, 27) capable of engaging with the corrugated tube (30), an attachment portion (29) capable of attaching to the protector (10), and a projection piece (28) projecting alongside the corrugated tube (30).

[5] The wire harness according to the item [4], wherein the corrugated tube (30) and the projection piece (28) are wound with a fixing tape together.

REFERENCE SIGNS LIST

1: Wire harness
2: Electric wire bundle
10: Protector
13: Communication hole
20: Link
25: Main body rib (engagement portion)
27: Lid rib (engagement portion)
28: Projection piece
29: End plate (attachment portion)
30: Corrugated tube
261: Curved portion (opening portion)
281: Projection
322: Outer surface
41: Adhesive tape (fixing tape)

The invention claimed is:

1. A link for linking a corrugated tube to a box-shaped protector, the link comprising:

an engagement portion capable of engaging with the corrugated tube;

an attachment portion capable of attaching to the protector; and a projection piece projecting alongside the corrugated tube, wherein the engagement portion comprises two main body ribs arranged side-by-side along a longitudinal direction of the corrugated tube, and wherein the two main ribs are configured to simultaneously fit into a same groove of the corrugated tube.

2. The link according to claim 1, wherein the link has an annular shape allowing the corrugated tube to be inserted to the link;

the engagement portion is provided on an inner surface of the link;

the attachment portion is provided on an outer surface of the link to be attached to the protector to establish a state that an opening portion of the link and an internal space of the protector are connected to each other; and the projection piece projects alongside outer surfaces of the corrugated tube from a circumferential periphery of the opening portion of the link.

3. The link according to claim 1, wherein the projection piece has a projection projecting to a direction to separate from the corrugated tube.

4. A wire harness comprising:

an electric wire bundle;

a corrugated tube housing the electric wire bundle;

a box-shaped protector to fix the corrugated tube; and a link linking the corrugated tube and the protector to each other, the link comprising an engagement portion capable of engaging with the corrugated tube, an attachment portion capable of attaching to the protector, and a projection piece projecting alongside the corrugated tube, wherein the engagement portion comprises two main body ribs arranged side-by-side along a longitudinal direction of the corrugated tube, and wherein the two main ribs are configured to simultaneously fit into a same groove of the corrugated tube.

5. The wire harness according to claim 4, wherein the corrugated tube and the projection piece are wound with a fixing tape together.

* * * * *